Figure 5:
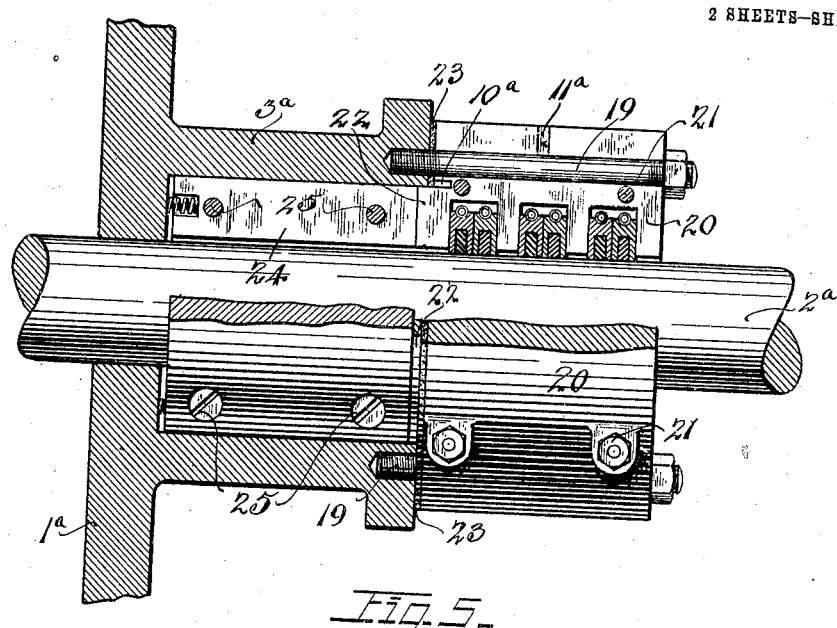

C. O. BULOCK.
METALLIC PACKING.
APPLICATION FILED MAY 25, 1910.
980,594.
Patented Jan. 3, 1911.
2 SHEETS—SHEET 1.
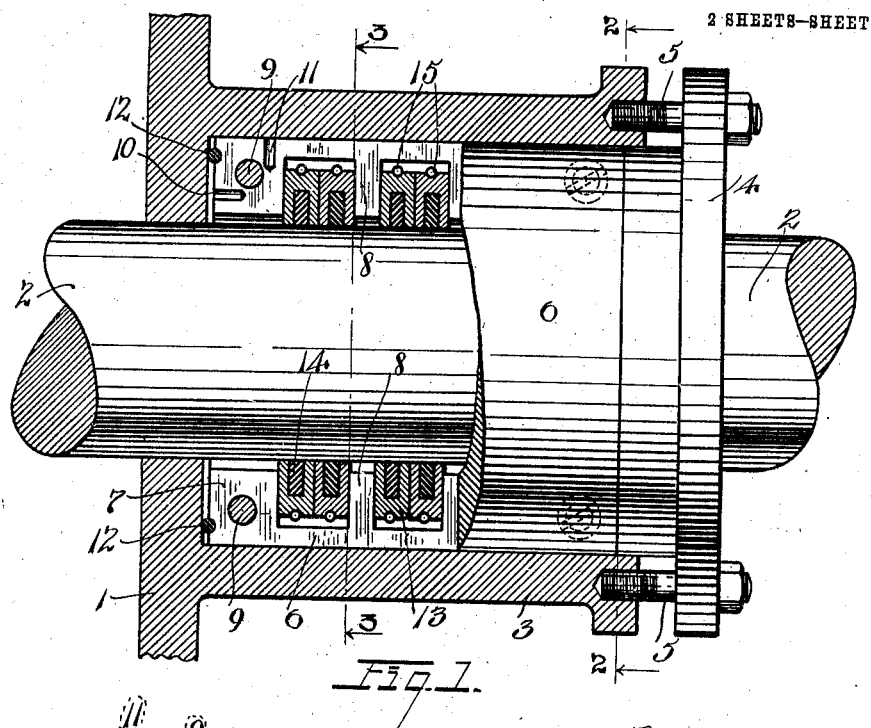
Fig. 1.
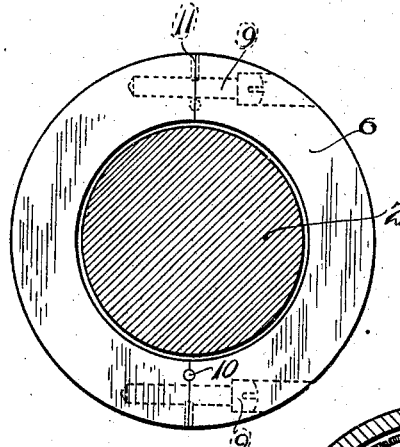
Fig. 2.
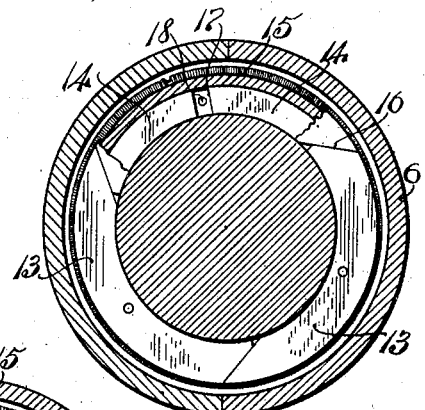
Fig. 3.
Fig. 4.
Witnesses.
Oliver M. Kappler
Brennan B. West
Inventor.
Chas. O. Bulock,
By J. R. Hull
Attorney

C. O. BULOCK.
METALLIC PACKING.
APPLICATION FILED MAY 25, 1910.

980,594.

Patented Jan. 3, 1911.
2 SHEETS—SHEET 2.

Witnesses
Oliver M. Kappler
Brennan B. West

Inventor
Chas. O. Bulock
By J. B. Hull
Attorney

UNITED STATES PATENT OFFICE.

CHARLES O. BULOCK, OF CLEVELAND, OHIO, ASSIGNOR TO THE H. W. JOHNS-MANVILLE COMPANY, OF CLEVELAND, OHIO, A CORPORATION OF NEW YORK.

METALLIC PACKING.

980,594.     Specification of Letters Patent.     Patented Jan. 3, 1911.

Application filed May 25, 1910. Serial No. 563,243.

*To all whom it may concern:*

Be it known that I, CHARLES O. BULOCK, a citizen of the United States, residing at Cleveland, in the county of Cuyahoga and State of Ohio, have invented a certain new and useful Improvement in Metallic Packings, of which the following is a full, clear, and exact description, reference being had to the accompanying drawings.

This invention relates to metallic packing for use on piston rods, valve stems and various other devices where such packing can be successfully employed; and it has for its object the improvement of such packing whereby the same will prevent more effectually the leakage of steam or other fluid under pressure, and which will bear with an even pressure about the rod or shaft passing through the same, whereby the wear of the packing and of the rod or shaft will be uniform.

Structures effecting the above stated object are shown in the drawings accompanying this application, in which—

Figure 6:
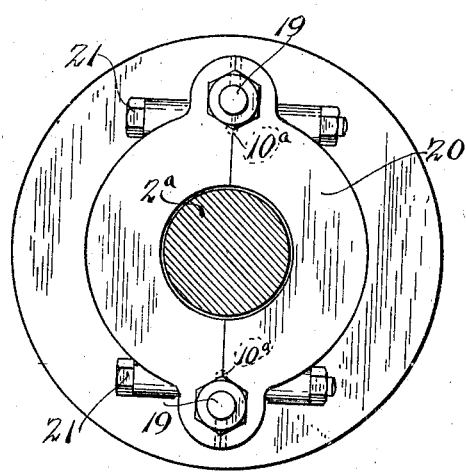

Figure 1 is a view taken longitudinally through the stuffing box and showing what I term the "inside type" of my invention, certain of the parts being shown in section and other of the parts in elevation; Fig. 2 is a transverse section taken on the line 2—2 of Fig. 1, the stuffing box being omitted; Fig. 3 is a sectional view taken through the outer casing of the packing and showing a packing-ring therein, parts of the latter being broken away for clearness of illustration; Fig. 4 is a view similar to Fig. 3, except that the parts broken away in the latter figure are shown in full, and the positions of the joints in the adjacent rings are shown in dotted lines; Fig. 5 is a view, partly in section and partly in elevation, of another embodiment of my invention which I term the "outside type", said view showing the stuffing box with the metallic packing secured to said box; and Fig. 6 is an end view of the invention shown in Fig. 5, the rod or shaft appearing in section.

First taking up a description of the "inside type" of my invention, the same being shown in Figs. 1 to 4 inclusive, 1 represents the head of the cylinder containing the steam or other fluid under pressure; 2 represents the rod or shaft passing through the said head; 3 represents the stuffing box attached to the said head and surrounding the rod or shaft, a space being maintained about the latter for the packing, and 4 is the packing gland, the same being secured to the stuffing box by the stud-screws 5, or by any other suitable means. The parts thus referred to are well known in the art and, except as they enter into combination with the metallic packing, constitute no part of my invention and need not be more specifically described.

Within the stuffing box 3, and surrounding the rod or shaft 2, is the casing 6 of the packing, said casing being made of gray iron or of any other suitable material, and forming a shell that fits within the stuffing box, the shell having inwardly projecting end flanges 7, one of the same appearing in Fig. 1. Intermediate said end flanges, the casing is provided with inwardly extending flanges 8, so that circumferential channels are formed on the interior of the casing, the flanges 7 and 8 being spaced slightly from the rod or shaft to provide for any irregularities in the latter. The casing 6 is formed in halves, said halves being secured together in any suitable manner, as by the fillister-head screws 9, the heads of the same resting in countersinks in one of the halves of the casing so that they will not interfere with the insertion of the latter into the stuffing box. For holding the halves of the casing in radial alinement, the same are bored at their ends to receive dowel pins 10, said pins resting partly in one half of the casing and partly in the other half. For holding the said halves in longitudinal alinement, similar dowel pins 11 are inserted in radial bores between the halves, as shown in Figs. 1 and 2. By these means, the halves of the casing are maintained in their proper relative positions. For preventing the leakage of the steam or other fluid to the stuffing box outside the casing, a ring 12 of lead, or other suitable substance, is interposed between the cylinder head and the end of the casing 6, said ring being compressed between these parts when the gland 4 is applied.

Within the channels between the flanges 7 and 8 of the casing, I place the packing rings, the same being preferably used in pairs, as shown in Fig. 1. Any number of such pairs may be employed as are necessary to overcome all leakage. These packing rings are made of any suitable metal and are of compound construction, the same consisting of the outer ring sections 13 and of the inner ring sections 14, the outer sections being channel-shaped in cross-section to receive the inner sections within the channels thereof. The interior edges of all of said sections 13 and 14 bear upon the rod or shaft 2 and form a fluid-tight joint therewith. The channels in the casing 6 are of sufficient width to receive a pair of the compound packing rings side by side, the rings being sufficiently loose to permit them to move radially in case any irregularities in the rod or shaft should necessitate such movement, and said channels are made of sufficient depth to accommodate such radial movement and to also provide space for the springs 15 that surround the ring sections 13 and press all of the sections toward the rod or shaft. As appears from Figs. 3 and 4, there are three of these sections 13 in each of the rings, although any other suitable number of such sections may be employed. The joints 16 between these sections are at an angle with respect to the radius of the ring, as shown, the angle being such as to permit the rings to settle inwardly to take up all wear.

The sections 14 of the inner ring correspond in number to the sections 13, and the joints 17 between the inner sections are broken with respect to the joints 16, so that each compound ring has a bearing at all points about the rod or shaft. As is shown in Fig. 3, the joints 17 are of sufficient width to permit dowel pins 18 to extend therethrough from side to side of the outer ring sections 13, said dowel pins preventing the inner sections from creeping about the rod or shaft, which movement, if permitted, might result in bringing the joints 17 into line with the joints 16 and in thus forming a leak through the compound ring. It will be understood from Fig. 3 that the inner beveled ends of the sections 13 are supported upon the inner sections 14 and are thus prevented from bearing with undue pressure against the rod or shaft; for the compressing springs 15 tend to cam these ends of the sections 13 inwardly and the opposite ends of the sections outwardly, so that these sections would, in the absence of the inner sections, bear with unequal pressures at their opposite ends. This unequal pressure would result in unequally wearing and grooving the rod or shaft, especially if it be reciprocated. The inner ring sections 14, however, hold the outer ring sections outwardly and thus prevent this inequality in the wear of the rod or shaft. As is indicated by the full and dotted lines in Fig. 4, the joints 16 in one ring are staggered with respect to the joints in the ring that is paired therewith, and the same staggered arrangement, of course, applies to the joints 17 between the inner ring sections.

Some of the fluid under pressure will enter the first channel in the casing 6 and reach the outsides of the first pair of packing rings by passing between the flange 7 and the adjacent ring. The pressure of the fluid against the face of the said adjacent ring presses the other ring with which it is paired against the flange 8 and thus prevents any considerable quantity of the fluid from passing the first pair of packing rings. Some fluid may pass the second pair of rings in the same manner; but the amount of the fluid thus passing is diminished with each pair of rings, and a sufficient number of pairs is employed to effectually stop all leakage.

Taking up the "outside type" of my invention as it is shown in Figs. 5 and 6, $1^a$, $2^a$, and $3^a$ represent, respectively, the cylinder head, the rod or shaft and the stuffing box, which parts may be identical with the corresponding parts in the "inside type" hereinbefore described. Secured to the outer end of the stuffing box, by means of the elongated stud-screws 19, is a split packing-ring casing 20, the same being divided diametrically and having its parts secured together by bolts 21. For properly alining the halves of the casing 20 both radially and longitudinally, dowel pins $10^a$ and $11^a$ are employed, said pins corresponding in position and function to the pins 10 and 11 of the other type of my invention. The casing 20 is provided with internal annular channels containing the pairs of packing rings, the same being identical in construction and operation with the rings hereinbefore described, so that no further description is deemed necessary. The casing 20 is provided at its inner end with an outwardly extending boss or shoulder 22 that extends into the stuffing box $3^a$ and thus acts as a gland for the said box. For preventing any leakage of the fluid between the stuffing box and the casing, a suitable gasket of packing material 23 is inserted between these parts. Fitting within the stuffing box $3^a$ is a hollow cylindrical packing member 24, the same being preferably formed in halves that are secured together by countersunk screws 25. This member loosely surrounds the rod or shaft so as to provide for any irregularities in the movement of the latter. The member 24 is preferably recessed at its inner end to receive short helical springs 26 that press said member outwardly against the boss or shoulder 22 of the casing 20 and thus provide a tight joint leading outwardly toward the gasket 23. The fluid under pressure, acting upon the inner end of the member 24, also presses the latter against said boss or shoulder, and thus prevents the leakage of the fluid outwardly at that point.

My invention may be applied to valve-rods in any form of compressed fluid engines, to the rods in fluid compressors, or to other moving parts past which fluid under compression has a tendency to leak. The term "rod", therefore, is employed in the claims in a generic sense, and is intended to include all sorts of moving parts to which the packing rings may be applied.

Having thus described my invention what I claim as new and desire to secure by Letters-Patent is:

1. As a new article of manufacture, a compound metallic packing ring for piston rod stuffing boxes and the like consisting of a plurality of metallic outer ring sections that are grooved on their interior surfaces and of a plurality of inner ring sections extending into the grooves of the outer ring sections, the joints between the outer sections breaking with the joints between the inner sections, and the inner edge of the outer ring closely embracing the rod.

2. As a new article of manufacture, a compound metallic packing ring for piston rod stuffing boxes and the like, the same consisting of a plurality of metallic outer ring sections that are grooved on their interior surfaces and of a plurality of inner ring sections within the grooves of the outer sections, the joints between the outer sections breaking with the joints of the inner sections, and the inner edge of the outer ring closely embracing the rod, and means surrounding the outer sections for holding them in position.

3. As a new article of manufacture, a compound metallic packing ring, the same consisting of a plurality of outer ring sections that are channeled on their interior surfaces, the joints between said sections being at an angle with the radius of the ring, and of a plurality of inner ring sections within the channels of the outer sections, the joints of the outer sections breaking with the joints of the inner sections, and means for maintaining the joints in their broken relations.

4. As a new article of manufacture, a compound metallic packing ring, the same consisting of a plurality of outer ring sections that are channeled on their inner surfaces and of a plurality of inner ring sections within the channels of the outer sections, the joints between the outer sections breaking with the joints between the inner sections, and pins carried by the outer sections and projecting into the channels thereof between the adjacent ends of the inner sections, whereby the joints are maintained in their broken relation.

5. As a new article of manufacture, a compound metallic packing ring, the same consisting of a plurality of outer ring sections that are channeled on their inner surfaces, the ends of the adjacent sections being in contact and each of the lines of contact being at an angle with respect to the corresponding radius of the ring, and of a plurality of inner ring sections within the channels of the outer sections, each inner section being within two adjacent outer sections and extending to substantially the centers of the latter whereby the joints between the outer sections are broken with respect to the joints of the inner sections and pins carried by the outer sections and extending into the channels thereof and through the joints of the inner sections.

6. As a new article of manufacture, a compound metallic packing ring, the same consisting of a plurality of outer ring sections that are channeled on their inner surfaces, the ends of the adjacent sections being in contact and each of the lines of contact being at an angle with respect to the corresponding radius of the ring, and of a plurality of inner ring sections within the channels of the outer sections, each inner section being within two adjacent outer sections and extending to substantially the centers of the latter, whereby the joints between the outer sections are broken with respect to the joints of the inner sections, pins carried by the outer sections and extending into the channels thereof and through the joints of the inner sections, and a spring surrounding the outer sections for holding them in position.

7. In a ring packing, the combination, with an annular channeled casing and the rod passing through the same, of a plurality of outer ring sections within the channel of the casing and surrounding and contacting with the rod, said sections being grooved on their interior surfaces, and a plurality of inner ring sections within the grooves of the outer sections, the joints of the outer sections breaking with the joints of the inner sections.

8. In a ring packing, the combination, with a divided casing having an annular channel in its interior surface, of the rod to be packed extending through the said casing, means for holding the parts of the divided casing together, and a compound metallic packing ring surrounding the rod within the channel of the casing, said compound ring consisting of a plurality of outer sections that are channeled on their interior surfaces and of a plurality of inner ring sections within the channels of the outer ring sections, all of said sections bearing against the rod and the joints of the outer sections breaking with the joints of the inner sections.

9. The combination, with a channeled casing and a rod passing through the same, of a pair of compound metallic packing rings within the channel of the casing and surrounding the rod, each of said rings comprising a plurality of outer sections that are grooved on their interior surfaces and of a plurality of inner ring sections within the grooves of the outer sections, the joints between the outer sections breaking with the joints between the inner sections, and the joints in one ring breaking with the corresponding joints in the ring paired therewith.

10. The combination, with a cylinder head, of a rod extending through said head, a stuffing-box projecting from the head and surrounding the rod, a split casing secured to the outer end of the stuffing-box, said casing being grooved in its interior surface, and a compound metallic packing ring within the groove of said casing, said ring comprising a plurality of outer ring sections having their inner surfaces channeled and of a plurality of inner ring sections within the channels of the outer sections, all of said sections contacting with the rod and the joints of the outer sections breaking with the joints of the inner sections, and means surrounding the outer sections and pressing all of the sections into contact with the rod.

11. The combination, with a cylinder head, of a rod extending through said head, a stuffing-box projecting from the head and surrounding the rod but spaced from the latter, a ring within the stuffing-box and surrounding the rod, springs acting against the inner end of the said ring and forcing the same outwardly, a split metallic casing secured to the outer end of the stuffing-box and surrounding the said rod, said casing having a boss projecting into the stuffing-box and pressing the ring therein backwardly against the tension of the said springs, and a compound packing ring within a channel on the inner surface of the said casing, said ring comprising a plurality of outer sections having channels on their inner surfaces and of a plurality of inner ring sections within the channels of the outer sections, the joints between the outer sections breaking with the joints of the inner sections, as and for the purpose specified.

12. The combination, with a cylinder head, of a rod passing through said head, a stuffing-box projecting from the head and surrounding the rod but spaced from the latter, a split metallic ring member within the stuffing-box and surrounding the rod, means for holding the parts of said member together, springs engaging the inner end of the member and tending to force the latter outwardly, a divided casing secured to the outer end of the stuffing-box, said casing being channeled on its interior surface, a boss projecting from the casing and extending into the stuffing-box against the ring member therein and pressing the latter backwardly against the said springs, and a pair of contacting compound metallic packing rings within the channel of the said casing, each of said rings comprising a plurality of outer sections having channels on their inner surfaces and a plurality of inner sections within the channels of the outer sections, the joints between the outer sections of each ring breaking with the joints between the inner sections thereof, and the joints of one ring breaking with the corresponding joints of the ring paired therewith.

In testimony whereof, I hereunto affix my signature in the presence of two witnesses.

CHARLES O. BULOCK.

Witnesses:
J. B. HULL,
BRENNAN B. WEST.